United States Patent [19]

Rahall

[11] 3,934,861

[45] Jan. 27, 1976

[54] METHOD AND APPARATUS FOR FLAME-CUTTING ANGLE IRONS

[75] Inventor: George A. Rahall, Bellevue Borough, Allegheny County, Pa.

[73] Assignee: United States Steel Corporation, Pittsburgh, Pa.

[22] Filed: Jan. 9, 1975

[21] Appl. No.: 539,668

[52] U.S. Cl. ............................... 266/23 R; 148/9 R
[51] Int. Cl.² ............................................. B23K 7/10
[58] Field of Search ......... 148/9 R; 266/23 R, 23 B, 266/23 C, 23 E, 23 K, 23 L, 23 M, 23 F, 23 HH

[56] References Cited
UNITED STATES PATENTS

| | | | |
|---|---|---|---|
| 1,977,640 | 10/1934 | Linden | 266/23 M |
| 2,389,239 | 11/1945 | Place | 266/23 K |
| 2,949,391 | 8/1960 | Anderson | 266/23 K |
| 3,713,637 | 1/1973 | Cable | 266/23 K |

*Primary Examiner*—Gerald A. Dost
*Attorney, Agent, or Firm*—Walter P. Wood

[57] ABSTRACT

A method and apparatus for flame-cutting segments from angle irons. The apparatus supports a torch for movement across the surface of an angle iron, the corner of which is directed upwardly. The torch moves horizontally and upwardly as it cuts the first leg and horizontally and downwardly as it cuts the second leg. The torch tip is directed at a constant 45° angle to the surface of the angle iron and maintained at a constant distance therefrom and moves at a constant pre-set speed throughout any one cutting operation.

8 Claims, 4 Drawing Figures

METHOD AND APPARATUS FOR FLAME-CUTTING ANGLE IRONS

This invention relates to an improved method and apparatus for flame-cutting segments from angle irons.

A conventional angle iron has two legs, usually of equal width, which extend at right angles to each other. Small size angle irons can be cut with a shear, but larger angle irons (for example, those having legs 6 inches or more in width and over ½ inch in thickness) usually are flame-cut with a torch. Commonly the torch is handled manually, as its tip is moved across the outside surface of each leg in turn, with the tip directed perpendicularly to the surface. As the cut in the first leg progresses from the outer edge to the corner where the legs intersect, blow-through from the torch deposits slag on the inside surface of the second leg. Before the second leg is cut, the operation must be interrupted while the slag build-up is scraped away so that a clean cut can be made in the second leg. At the conclusion of the cutting operation, it has been necessary to grind the cut end with a hand grinder to obtain a surface of acceptable quality. Consequently the known procedure is unduly slow and costly.

An object of my invention is to provide an improved method and apparatus for flame-cutting angle irons in which the torch is supported and moved mechanically over a workpiece and cuts a segment therefrom in a single continuous operation and in which the cut end of the workpiece is of acceptable surface quality without need for hand grinding.

A further object is to provide an improved method and apparatus for flame-cutting angle irons in which the torch tip is directed at substantially 45° to the outside surface of the legs of the workpiece throughout the operation, thereby minimizing slag deposits on the inside surface.

A more specific object is to provide a portable flame-cutting apparatus for angle irons, which apparatus positions a torch tip at substantially 45° to the outside surface of the legs of the workpiece, moves the torch at a constant pre-set speed continuously across the two legs, and maintains a constant distance between the tip and the leg surfaces.

Figure 1:
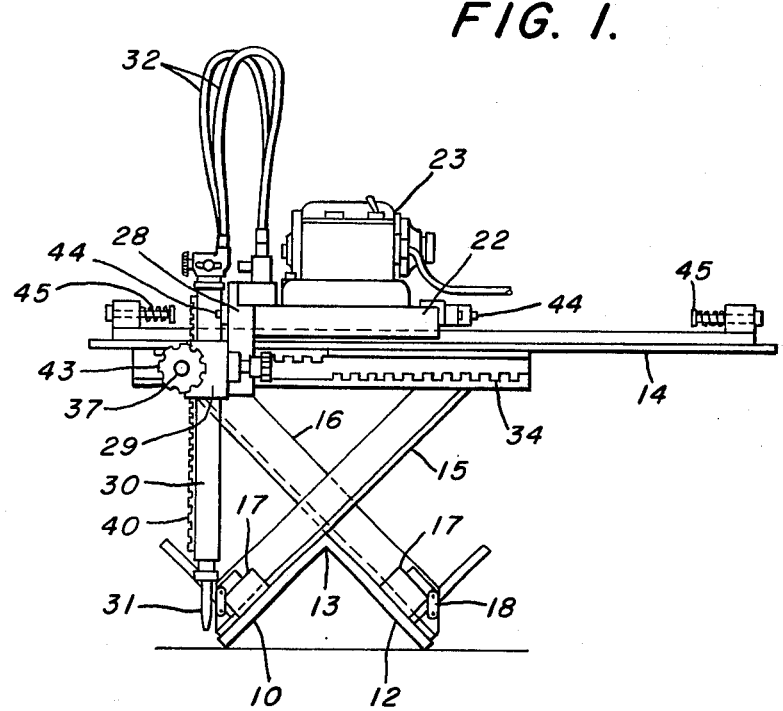
FIG. 1 is a side elevational view of my improved apparatus positioned on an angle iron workpiece for cutting.

FIG. 1 shows a conventional angle iron workpiece which has legs 10 and 12 and a corner 13 where the legs intersect. The workpiece is positioned so that it extends horizontally with its corner 13 facing upwardly and the surfaces of the two legs 10 and 12 sloping at substantially 45° to the horizontal.

The flame-cutting apparatus of my invention has a frame which includes a horizontally extending support member 14, and a pair of depending crossed legs 15 and 16 sloping at substantially 45° to the vertical or at right angles to each other. The apparatus is portable and preferably the frame is of light-weight metal. I place the apparatus over the workpiece with the legs 15 and 16 of the frame overlying the respective legs 10 and 12 of the workpiece. Preferably the legs 15 and 16 carry permanent magnets 17 for clamping the apparatus in a steady position on the workpiece. I mount the magnets on toggle linkages 18, which enable me to retract the magnets out of contact with the workpiece. Thus I can position the apparatus accurately on the workpiece before I clamp it in place with the magnets. Suitable toggle linkages are available commercially. One example is available from American Drill Bushing Company, Los Angeles, California, and Chicago, Illinois, under the designation ADB 62075.

The apparatus includes a carriage 22 mounted on the support member 14 for horizontal travel therealong. As best shown in the cut-away view of FIG. 2, I mount a reversible variable speed drive motor 23 and a gear reducer 24 on top of the carriage 22. The gear reducer has a depending output shaft 25, the lower end of which carries a pinion 26. The upper face of the support member 14 carries a stationary horizontally extending gear rack 27 which pinion 26 engages for driving the carriage in either direction. The carriage also carries a torch support 28 of inverted L-shape. The torch support has a vertical leg which carries a sleeve 29. I mount a conventional oxygen-acetylene torch 30 or equivalent in sleeve 29 for vertical movement as hereinafter described. The torch has a vertically directed cutting tip 31. Gases are conducted to the torch via the usual hoses 32.

Figure 2:
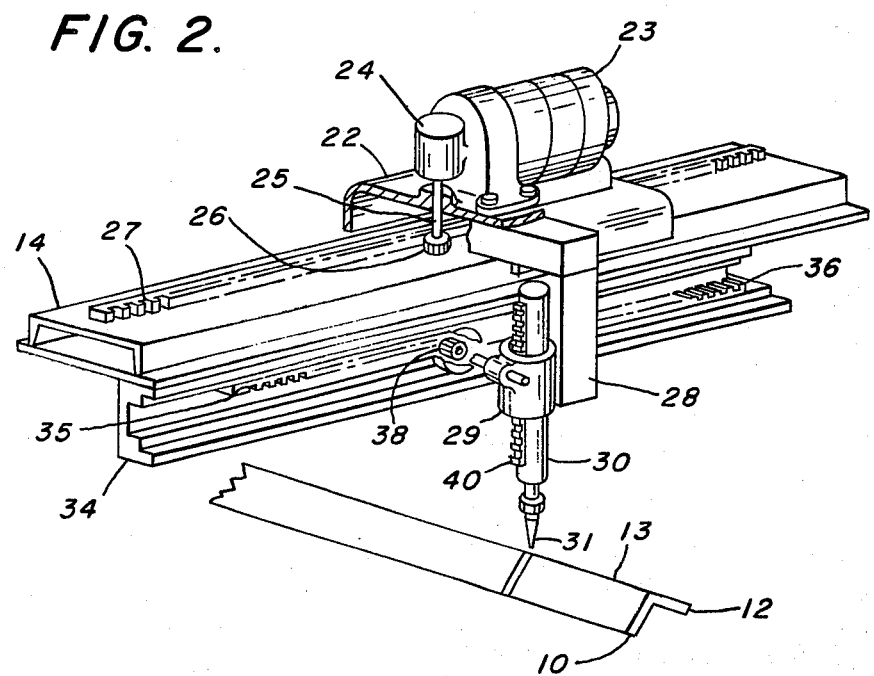
FIG. 2 is a diagrammatic cut-away perspective view illustrating details of the mechanism embodied in the apparatus.
Figure 3:
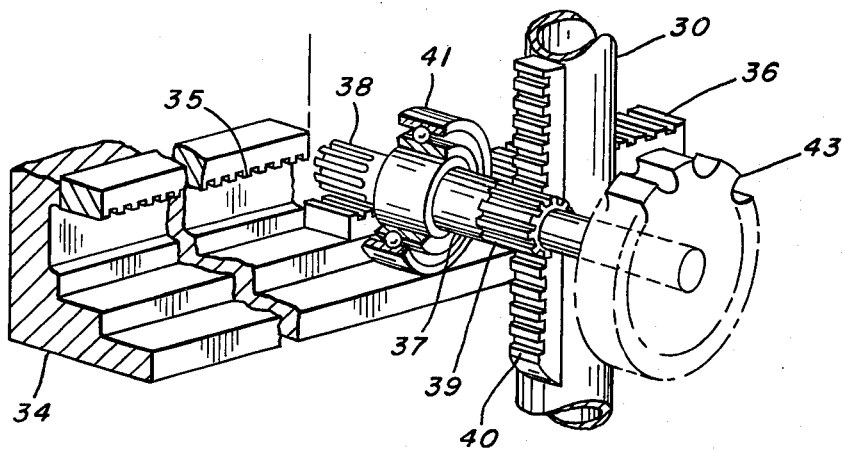
FIG. 3 is another diagrammatic perspective view on a larger scale than FIG. 2 further illustrating details of the mechanism.

As best shown in FIGS. 2 and 3, the support member 14 carries a channel 34 fixed to its lower face. The upper flange of channel 34 carries a stationary, horizontally extending, downwardly facing gear rack 35, the inner end of which lies directly over the point where the crossed legs 15 and 16 intersect. The lower flange of channel 34 carries a stationary, horizontally extending upwardly facing gear rack 36, the inner end of which also lies directly over the point where the legs intersect or directly under the point where the downwardly directed gear rack 35 terminates. A pinion shaft 37 is journaled in the sleeve 29 for rotation on a horizontal axis. At its inner end the pinion shaft has an integral follower pinion 38 which engages gear racks 35 and 36 in turn. Near its outer end the pinion shaft has an integral drive pinion 39 which engages a vertically extending gear rack 40 fixed to the body of torch 30. Intermediate the two pinions the pinion shaft carries a roller 41 which may be a conventional antifriction bearing. Roller 41 rides on the lower flange of channel 34 to steady the shaft. At its outer end the pinion shaft carries an adjusting knob 43.

In operation, I position the apparatus on a workpiece 10, 12 and clamp it in place as shown in FIG. 1 and already described. At the start the tip 31 of torch 30 is located above a point just outside the edge of leg 10 and spaced a predetermined distance above the leg surface. I turn on the torch 30 and start motor 23 in a direction to rotate pinion 26 counterclockwise when viewed from above. Engagement of pinion 26 with the gear rack 27 moves carriage 22 and the parts which it carries toward the right. The follower pinion 38 first engages the upper gear rack 35, whereby it rotates the pinion shaft 37 counterclockwise. Thus the drive pinion 39 drives the vertical gear rack 40 and torch 30 upwardly. When the torch tip 31 reaches a position directly over the corner 13 of the workpiece, the follower pinion 38 runs off the end of the upper gear rack 35 and engages the lower gear rack 36. Now the follower pinion rotates the pinion shaft 37 clockwise and the drive pinion 39 drives the vertical gear rack 40 and torch 30 downwardly. At the conclusion of the cutting operation, I can move the apparatus to another location and operate it in the reverse direction to make another cut. As shown in FIG. 1, preferably I equip the carriage 22 with limit switches 44, and the support member 14 with cooperating adjustable spring-loaded stops 45 to prevent overtravel of the carriage in either direction.

I proportion the parts so that the upward and downward travel of the cutting tip 31 maintains the tip at a constant distance from the surface of the legs 10 and 12. In the example of a conventional angle iron, which has legs of equal length at right angles to each other, the tip travels equal distances horizontally and vertically and always is directed at an angle of 45° to the surface of the legs. The tip always travels in a straight line parallel with the surface which it is cutting. The tip travels at constant pre-set speed throughout any one cutting operation. The apparatus is adjustable for cutting workpieces of different thickness or compositions. As already explained, the speed of motor 23 is variable, whereby I can vary the speed at which the torch passes over a workpiece. To vary the distance between the cutting tip and the surface of the workpiece, I drive the carriage 22 to a position in which the follower pinion 38 runs off the outer end of either gear rack 35 or 36. As FIG. 2 shows, the gear rack 27 extends farther to the left than the gear rack 35 and/or farther to the right than gear rack 36 to make this possible. Now I rotate the adjustment knob 43 to turn the pinion shaft 37 and move the torch 30 up or down without moving the carriage horizontally.

Figure 4:
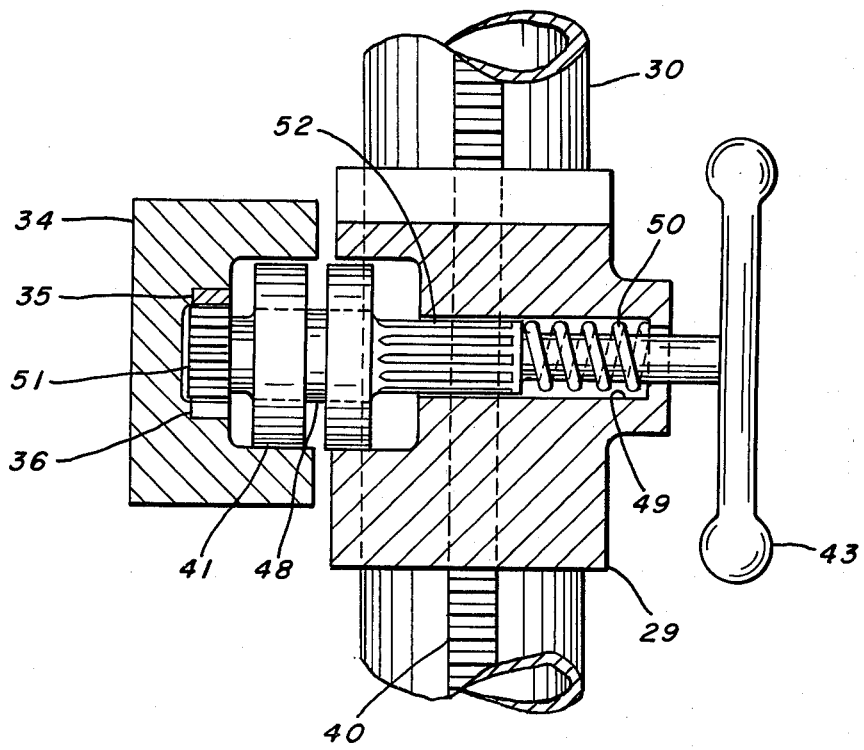
FIG. 4 is a vertical sectional view of the mechanism showing a modification.

FIG. 4 shows a modification in which I have simplified the procedure for adjusting the distance between the torch tip and the surface of the workpiece. The modified apparatus includes a pinion shaft 48 which is movable axially. The torch-supporting sleeve has a counterbore 49 in which I place a compression spring 50 encircling the pinion shaft and urging it inwardly. The pinion shaft has a follower pinion 51 similar to that already described and a lengthened drive pinion 52. With this arrangement, I pull the pinion shaft outwardly against the action of spring 50 to a position in which pinion 51 is disengaged, and turn the shaft to move the torch up or down without moving the carriage horizontally. The lengthened drive pinion 52 enables this pinion to remain in engagement with the gear rack on the torch even though the follower pinion 51 is disengaged.

From the foregoing description it is seen that my invention affords a method and apparatus for handling a torch mechanically as the torch is used to cut an angle iron workpiece. The torch tip is directed at a constant 45° angle to the surface of the workpiece, and automatically moves over the workpiece at a constant pre-set speed, and at a constant distance from the surface thereof, and always in a straight line parallel with the surface which it is cutting. I pre-set the speed rate in accordance with the thickness of the workpiece. Slag generated during the cutting operation is blown downwardly away from the inside surface of the workpiece, rather than on this surface. Thus the workpiece is cut cleanly and in a single continuous operation.

I claim:

1. An apparatus for flame-cutting segments from an angle iron workpiece which has two legs and a corner where the legs intersect and is positioned with the corner facing upwardly, said apparatus comprising:

a frame adapted to be positioned over the workpiece;

a carriage mounted on said frame for horizontal movement therealong;

a torch mounted on said carriage for vertical movement with respect thereto and having a cutting tip at its lower end;

drive means on said carriage for moving said carriage and said torch horizontally across the workpiece; and pinion means on said carriage operatively connected with said frame and said torch for moving said torch upwardly with respect to said carriage while said carriage and torch move horizontally across the first of the legs of the workpiece and downwardly with respect to said carriage while said carriage and torch move horizontally across the second of the legs of the workpiece;

said pinion means constraining said tip to move in a straight line at a constant angle with respect to the workpiece and at a constant distance therefrom, and at a constant speed as long as the carriage speed is constant.

2. An apparatus as defined in claim 1 in which said drive means moves said torch equal distances horizontally and upwardly across the first leg, and equal distances horizontally and downwardly across the second leg.

3. An apparatus as defined in claim 1 in which said frame includes a support member and a pair of crossed legs depending from said support member intersecting each other at right angles to be placed on an angle iron workpiece with the legs of the frame overlying the respective legs of the workpiece.

4. An apparatus as defined in claim 3 comprising in addition magnets carried by said legs for clamping said frame on the workpiece, and means for retracting said magnets to enable said frame to be positioned on the workpiece before it is clamped thereon.

5. An apparatus as defined in claim 1 in which said pinion means includes a pinion shaft journaled for rotation with respect to said carriage and movable horizontally therewith, a pair of horizontally extending oppositely facing gear racks on said frame terminating above a common point, a follower pinion on said pinion shaft engaging each of said racks in turn, a vertically extending gear rack on said torch, and a drive pinion on said pinion shaft engaging said vertically extending rack.

6. An apparatus for flame-cutting segments from an angle iron workpiece which has two legs and a corner where the legs intersect and is positioned with the corner facing upwardly, said apparatus comprising:

a frame adapted to be positioned over the workpiece;

a carriage mounted on said frame for horizontal movement over the workpiece;

a torch having a cutting tip at its lower end;

means on said carriage supporting said torch for horizontal movement therewith and vertical movement with respect thereto;

a driven pinion on said carriage;

a horizontally extending gear rack on said frame engaged by said pinion;

a pinion shaft journaled in said torch supporting means;

a pair of horizontally extending oppositely facing gear racks on said frame terminating above a common point;

a follower pinion on said pinion shaft engaging each of said oppositely facing racks in turn;
a vertically extending gear rack on said torch; and
a drive pinion on said pinion shaft engaging said vertically extending rack;
whereby horizontal movement of said carriage moves said torch with the tip thereof traveling in a straight line horizontally and upwardly across the first of the legs of the workpiece and in a straight line horizontally and downwardly across the second of the legs of the workpiece.

7. An apparatus as defined in claim 6 in which said first-named rack extends outside at least one of said oppositely facing racks and said carriage is movable to a position in which said follower pinion is disengaged, whereby said pinion shaft can be turned to adjust said torch vertically without moving said torch horizontally.

8. An apparatus as defined in claim 6 in which said pinion shaft is movable axially to disengage said follower pinion, whereby said pinion shaft can be turned to adjust said torch vertically without moving said torch horizontally.

* * * * *